United States Patent
Ribas-Corbera et al.

(10) Patent No.: US 7,646,816 B2
(45) Date of Patent: Jan. 12, 2010

(54) GENERALIZED REFERENCE DECODER FOR IMAGE OR VIDEO PROCESSING

(75) Inventors: Jordi Ribas-Corbera, Redmond, WA (US); Philip A. Chou, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 581 days.

(21) Appl. No.: 09/955,731

(22) Filed: Sep. 19, 2001

(65) Prior Publication Data

US 2003/0053416 A1 Mar. 20, 2003

(51) Int. Cl.
*H04B 1/66* (2006.01)

(52) U.S. Cl. .................. 375/240.25; 375/240.26; 375/240.28; 375/240.23; 382/233; 382/235; 382/246

(58) Field of Classification Search ............ 375/240.25, 375/224, 249, 240.26, 240.28, 240.23; 382/235, 382/233, 232, 246; 709/232, 233, 234, 235, 709/231
See application file for complete search history.

(56) References Cited

U.S. PATENT DOCUMENTS

| | | | |
|---|---|---|---|
| 4,706,260 A | 11/1987 | Fedele et al. | |
| 4,954,892 A | 9/1990 | Asai et al. | |
| 5,235,618 A | 8/1993 | Sakai et al. | |
| 5,291,486 A | 3/1994 | Koyanagi | |
| 5,301,242 A | 4/1994 | Gonzales et al. | |
| 5,365,552 A | 11/1994 | Astle | |
| 5,541,852 A * | 7/1996 | Eyuboglu et al. | ........... 709/232 |
| 5,566,208 A | 10/1996 | Balakrishnan | |
| 5,606,539 A | 2/1997 | De Haan et al. | |
| 5,608,697 A | 3/1997 | De Haan et al. | |
| 5,844,867 A | 12/1998 | De Haan et al. | |
| 5,933,451 A * | 8/1999 | Ozkan et al. | ........... 375/224 |
| 5,952,943 A | 9/1999 | Walsh et al. | |
| 5,970,173 A | 10/1999 | Lee et al. | |
| 6,060,997 A * | 5/2000 | Taubenheim et al. | ....... 340/7.52 |
| 6,141,053 A | 10/2000 | Sâukkonen | |

(Continued)

FOREIGN PATENT DOCUMENTS

EP 0852445 A2 8/1998

(Continued)

OTHER PUBLICATIONS

Anonymous, International Search Report in Corresponding EP Application No. EP 02 01 9056.

(Continued)

*Primary Examiner*—Shawn An
(74) *Attorney, Agent, or Firm*—Klarquist Sparkman, LLP

(57) ABSTRACT

A method and system including an improved generalized reference decoder that operates according to any number of sets of rate and buffer parameters for a given bit stream. Each set characterizes a leaky bucket model and contains three parameters representing the transmission bit rate, buffer size, and initial decoder buffer fullness. An encoder provides at least two sets of these parameters, whereby the decoder selects one or interpolates between them to operate at any desired peak bit rate, buffer size or delay. The generalized reference decoder may select the smallest buffer size and corresponding delay that decodes the bit stream without buffer underflow or overflow, or alternatively may select and operate at the minimum required peak transmission rate, or something between both. In practice, the buffer size, delay and/or the peak transmission rate can be reduced by significant factors, and/or the signal-to-noise ratio (SNR) can be increased.

65 Claims, 5 Drawing Sheets

U.S. PATENT DOCUMENTS

| | | | |
|---|---|---|---|
| 6,233,226 B1* | 5/2001 | Gringeri et al. | 370/252 |
| 6,408,096 B2 | 6/2002 | Tan | |
| 6,459,811 B1* | 10/2002 | Hurst, Jr. | 382/232 |
| 6,671,323 B1 | 12/2003 | Tahara et al. | |
| 6,728,317 B1 | 4/2004 | Demos | |
| 6,775,840 B1 | 8/2004 | Naegel et al. | |
| 6,792,048 B1 | 9/2004 | Lee et al. | |
| 6,873,629 B2* | 3/2005 | Morris | 370/535 |
| 2002/0012394 A1 | 1/2002 | Hatano et al. | |
| 2002/0061067 A1 | 5/2002 | Lyons et al. | |
| 2002/0061073 A1 | 5/2002 | Huang et al. | |
| 2002/0080875 A1 | 6/2002 | Tahara et al. | |
| 2002/0191712 A1 | 12/2002 | Gaddam et al. | |
| 2004/0142699 A1 | 7/2004 | Jollota et al. | |
| 2005/0074061 A1 | 4/2005 | Ribas-Corbera et al. | |
| 2006/0143678 A1 | 6/2006 | Chou et al. | |

FOREIGN PATENT DOCUMENTS

| | | |
|---|---|---|
| JP | 04-297179 | 10/1992 |
| JP | 08-223385 | 8/1996 |
| JP | 10-294757 | 11/1998 |
| JP | 2001-169261 | 6/2001 |
| KR | 10-2001-39215 | 5/2001 |

OTHER PUBLICATIONS

Reibman, Amy R.; Haskell, Barry G. "Constraints on Variable Bit-Rate Video for ATM Networks" *IEEEE Transactions on Circuits and Systems for Video Technology*, vol. 2, No. 4. Dec. 1992. p. 361-372.
Hsu, Chi-Yuan; Reibman, Amy R. "Joint Selection of Source and Channel Rate for VBR Video Transmission Under ATM Policing Constraints" *IEEEE Journal on Selected Areas in Communications*, vol. 15, No. 6. Aug. 1997. p. 1016-1028. XP 000694451.
Annex-B "Hypothetical Reference Decoder" Video Coding For Low Bit Rate Communication. *International Telecommunications Union*. H.263. Feb. 1998. XP 002248657 p. 48-50.
Annex-C "Video Buffering Verifier" Information Technology-Generic Coding of Moving Pictures and Associated Audio Information: Video. *International Telecommunications Union*. H. 262. Feb. 2000 XP 002248658 p. 137-142.
Annex-C "Information Technology—Coding of Moving Pictures and Associated Audio for Digital Storage Media at up to about 1,5 Mbit/s," *International Standard ISO/IEC 11172-2*, 1(2); pp. 49-50, Aug. 1993.
Annex-C "Line Transmission of Non-Telephone Signals—Video Codec for Audiovisual Services at px64 kbits," *International Telecommunication Union—Telecommunication Standardization Sector, Recommendation H.261*, pp. 23-24, Mar. 1993.
Annex-D "Information Technology—Coding of Audio-Visual Objects: Visual," *ISO/IEC 14496-2*, pp. i, 300, Mar. 1998.
Chen et al., "Source Model for Transform Video Coder and Its Application—Part II: Variable Frame Rate Coding," *IEEE Transactions on Circuits and Systems for Video Technology*, 7(2); pp. 299-311, Apr. 1997.
ISO/IEC JVT-D131, "HRD and Related Issues," 5 pp. (Jul. 2002).
ISO/IEC 11172-2, "Coding of Moving Pictures and Associated Audio for Digital Storage Media at Up to About 1,5 Mbit/s, Part 2: Video," 122 pp. (Aug. 1993).
ISO/IEC 14496-2, "Coding of Audio-Visual Objects: Visual," 330 pp. (Mar. 1998).
ITU-T Recommendation H.261, "Line Transmission of Non-Telephone Signals," International Telecommunication Union, 28 pp. (Mar. 1993).
ITU-T Recommendation H.262, "Transmission of Non-Telephone Signals," International Telecommunication Union, 211 pp. (Jul. 1995).
ITU-T Recommendation H.263, "Series H: Audiovisual and Multimedia Systems, Infrastructure of Audiovisual Services—Coding of Moving Video," International Telecommunication Union, 167 pp. (Feb. 1998).
Ribas-Corbera et al., "A Generalized Hypothetical Reference Decoder for H.264/AVC," *IEEE Transactions on Circuits and Systems for Video Technology*, 13(7); 14 pp. (Jul. 2003).
ISO/IEC 13818-1, "MPEG-2 Systems—Coding of Moving Pictures and Associated Audio," 129 pp. (Mar. 1994).
Cliff Reader, "History of MPEG Video Compression—Ver. 4.0," 99 pp., document marked Dec. 16, 2003.
Printouts of FTP directories from http://ftp3.itu.ch , 8 pp. (downloaded from the World Wide Web on Sep. 20, 2005.).
ISO/IEC JVT-D157, "Joint Video Specification," 206 pp. (Jul. 2002).
ISO/IEC JVT-E133, "Time—Shift Causality Constraint on the CAT-LB HRD," 8 pp. (Oct. 2002).
ITU-Telelcommunications Standardization Sector, VCEG-N58, "A Generalized Hypothetical Reference Decoder for H.26L," 14 pp. (Sep. 2001).
Sullivan et al., "The H.264/AVC Advanced Video Coding Standard: Overview and Introduction to the Fidelity Range Extensions," 21 pp. (Aug. 2004).
Pao et al., "Encoding Stored Video for Streaming Applications," *IEEE Transactions on Circuits and Systems for Video Technology*, vol. 11, No. 2, pp. 199-209 (Feb. 2001).
Reed et al., "Constrained Bit-Rate Control for Very Low Bit-Rate Streaming-Video Applications," *IEEE Transactions on Circuits and Systems for Video Technology*, vol. 11, No. 7, pp. 882-889 (Jul. 2001).
Sheu et al., "A Buffer Allocation Mechanism for VBR Video Playback," Communication Tech. Proc. 2000, WCC-ICCT 2000, vol. 2, pp. 1641-1644 (2000).
Walpole et al., "A Player for Adaptive MPEG Video Streaming over the Internet," Proc. SPIE, vol. 3240, pp. 270-281 (1998).
Search Report dated Aug. 12, 2003, from European Patent Application No. 02019056.7, 4 pp.
Communication dated May 10, 2004, from European Patent Application No. 02019056.7, 7 pp.
Search Report dated May 17, 2006, from European Patent Application No. 06006864.0, 4 pp.
Search Report dated Mar. 16, 2007, from European Patent Application No. 06006864.0, 5 pp.
Communication dated Apr. 23, 2007, from European Patent Application No. 06006864.0, 8 pp.
Search Report dated Mar. 21, 2007, from European Patent Application No. 06022341.9, 5 pp.
Communication dated Apr. 4, 2007, from European Patent Application No. 06022341.9, 8 pp.
Official Notice of Rejection dated Feb. 5, 2008, from Japanese Patent Application No. 2002-273882, 5 pp.
Decision to Grant a Patent dated Sep. 3, 2008, from Japanese Patent Application No. 2002-273882, 6 pp.
Office Action from Korean Patent Application No. 10-2002-56115, 5 pp.
First Office Action dated Oct. 14, 2005, from Chinese Patent Application No. 02143213.9, 9 pp.
Second Office Action dated Feb. 29, 2008, from Chinese Patent Application No. 02143213.9, 13 pp.
Notice on Grant of Patent dated Oct. 17, 2008, from Chinese Patent Application No. 02143213.9, 4 pp.
Office Action dated Jul. 25, 2008, from Chinese Patent Application No. 200610079930.6, 9 pp.
Joint Video Team (JVT) of ISO/IEC MPEG & ITU-T VCEG, ISO/IEC JVT-E075, "HRD Clean-up," 7 pp. (Oct. 2002).
ITU-T Recommendation H.263, "Draft H.263," International Telecommunication Union, pp. 5, 46, 47 (Jan. 1998).
ISO/IEC 13818-1, "MPEG-2 Systems—Coding of Moving Pictures and Associated Audio," second edition, 171 pp. (Dec. 2000).

* cited by examiner

GENERALIZED REFERENCE DECODER FOR IMAGE OR VIDEO PROCESSING

FIELD OF THE INVENTION

The present invention relates to the decoding of image and video signals, as well as other time varying signals such as speech and audio.

BACKGROUND OF THE INVENTION

In video coding standards, a bit stream is compliant if it can be decoded, at least conceptually, by a mathematical model of a decoder that is connected to the output of an encoder. Such a model decoder is known as the hypothetical reference decoder (HRD) in the H.263 coding standard, and the video buffering verifier (VBV) in the MPEG coding standard. In general, a real decoder device (or terminal) comprises a decoder buffer, a decoder, and a display unit. If a real decoder device is constructed according to the mathematical model of the decoder, and a compliant bit stream is transmitted to the device under specific conditions, then the decoder buffer will not overflow or underflow, and decoding will be performed correctly.

Previous reference (model) decoders assume that a bit stream will be transmitted through a channel at a given constant bit rate, and will be decoded (after a given buffering delay) by a device having some given buffer size. Therefore, these models are quite inflexible and do not address the requirements of many of today's important video applications such as broadcasting live video, or streaming pre-encoded video on demand over network paths with various peak bit rates, to devices with various buffer sizes.

In previous reference decoders, the video bit stream is received at a given constant bit rate, (usually the average rate in bits per second of the stream), and is stored in the decoder buffer until the buffer reaches some desired level of fullness. For example, at least the data corresponding to one initial frame of video information is needed before decoding can reconstruct an output frame therefrom. This desired level is denoted as the initial decoder buffer fullness, and at a constant bit rate is directly proportional to the transmission or start-up (buffer) delay. Once this fullness is reached, the decoder instantaneously (in essence) removes the bits for the first video frame of the sequence, and decodes the bits to display the frame. The bits for the following frames are also removed, decoded, and displayed instantaneously at subsequent time intervals.

Such a reference decoder operates at a fixed bit rate, buffer size, and initial delay. However, in many contemporary video applications, (e.g., video streaming through the Internet or ATM networks), the peak bandwidth varies according to the network path. For example, the peak bandwidth differs based on whether the connection to the network is by modem, ISDN, DSL, cable and so forth. Moreover, the peak bandwidth may also fluctuate in time according to network conditions, e.g., based on network congestion, the number of users connected, and other known factors. Still further, the video bit streams are delivered to a variety of devices with different buffer capabilities, including hand-sets, Personal Digital Assistants (PDAs), PCs, pocket-sized computing devices, television set-top boxes, DVD-like players, and the like, and are created for scenarios with different delay requirements, e.g., low-delay streaming, progressive download, and the like.

Existing reference decoders do not adjust for such variables. At the same time, encoders typically do not and cannot know in advance what the variable conditions will be for a given recipient. As a result, resources and/or delay time are often wasted unnecessarily, or are unsuitable in many instances.

SUMMARY OF THE INVENTION

Briefly, the present invention provides an improved generalized reference decoder that operates according to any number of sets of rate and buffer parameters for a given bit stream. Each set characterizes what is referred to as a leaky bucket model, or parameter set, and contains three values (R, B, F), where R is the transmission bit rate, B is the buffer size, and F is the initial decoder buffer fullness. As is understood, F/R is the start-up or initial buffer delay.

An encoder creates a video bit stream that is contained by some desired number N of leaky buckets, or the encoder can simply compute the N sets of parameters after the bit stream has been generated. The encoder passes the number to the decoder (at least) once, with a corresponding number of (R, B, F) sets in some way, such as in an initial stream header or out-of-band.

When received at the decoder, if at least two sets are present, the generalized reference decoder selects one or interpolates between the leaky bucket parameters, and can thereby operate at any desired peak bit rate, buffer size or delay. More particularly, given a desired peak transmission rate R', which is known at the decoder end, the generalized reference decoder selects the smallest buffer size and delay (according to the available (R, B, F) sets whether by selection of one, interpolation between two or more, or by extrapolation) that will be able to decode the bit stream without suffering from buffer underflow or overflow. Alternatively, for a given decoder buffer size B', the hypothetical decoder will select and operate at the minimum required peak transmission rate.

Benefits of the generalized reference decoder include that a content provider can create a bit stream once, and a server can deliver it to multiple devices of different capabilities, using a variety of channels of different peak transmission rates. Alternatively, a server and a terminal can negotiate the best leaky bucket parameters for the given networking conditions, e.g., the one that will produce the lowest start-up (buffer) delay, or the one that will require the lowest peak transmission rate for the given buffer size of the device. In practice, the buffer size and the delay for some terminals can be reduced by an order of magnitude, or the peak transmission rate can be reduced by a significant factor (e.g., four times), and/or the signal-to-noise ratio (SNR) can increase perhaps by several dB without increasing the average bit rate, except for a negligible amount of additional bits to communicate the leaky bucket information.

Other benefits and advantages will become apparent from the following detailed description when taken in conjunction with the drawings, in which:

DETAILED DESCRIPTION

Exemplary Operating Environment

Figure 1:
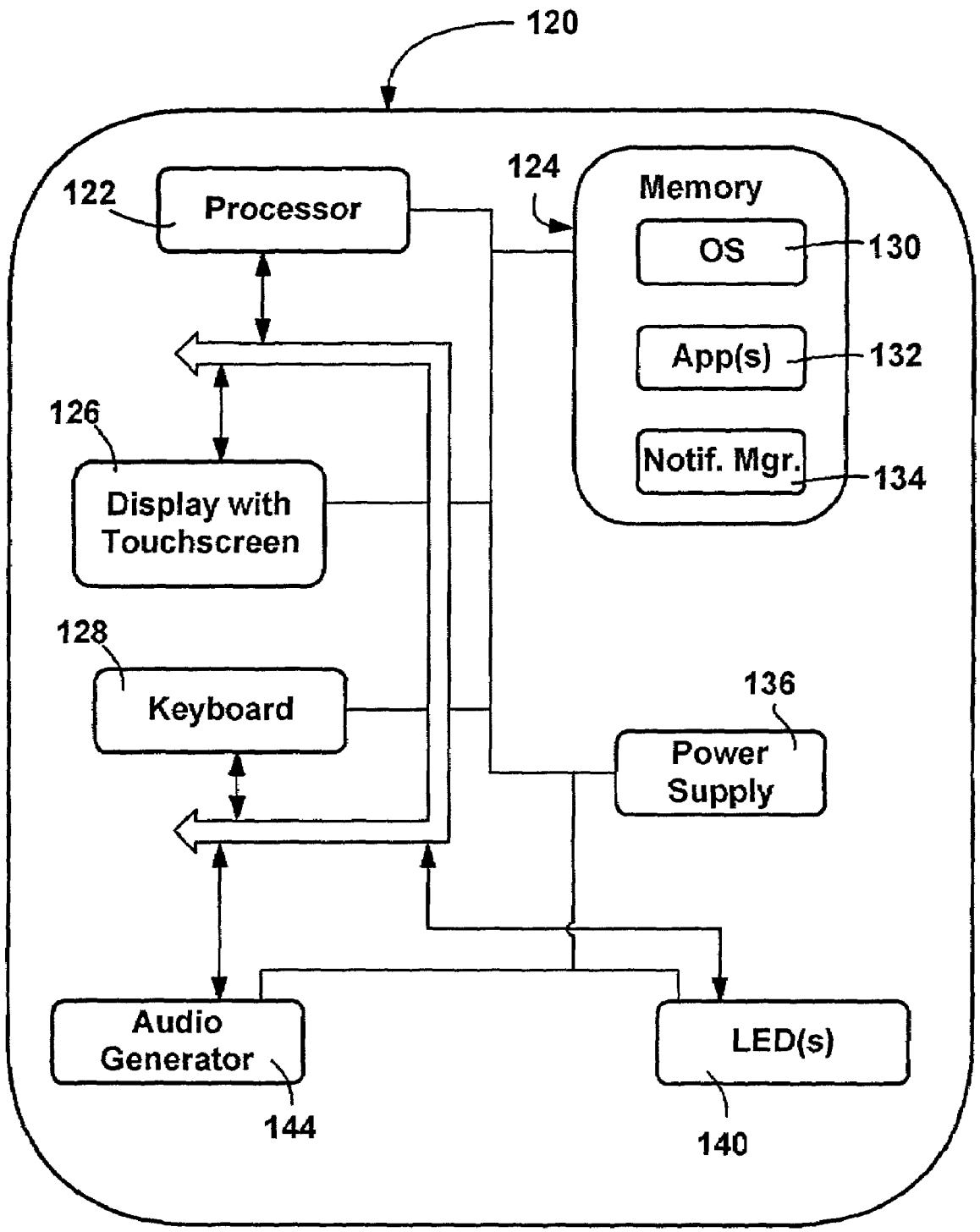
FIG. 1 is a block diagram representing an exemplary computer system into which the present invention may be incorporated.

FIG. 1 illustrates an example of a suitable operating environment 120 in which the invention may be implemented, particularly for decoding image and/or video data. The operating environment 120 is only one example of a suitable operating environment and is not intended to suggest any limitation as to the scope of use or functionality of the invention. Other well known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like. For example, it is likely that encoding image and/or video image data often will be performed on a computer with more processing power than contemporary hand-held personal computers, but there is no reason encoding cannot be performed on the exemplary device, or decoding on a more powerful machine.

The invention may be described in the general context of computer-executable instructions, such as program modules, executed by one or more computers or other devices. Generally, program modules include routines, programs, objects, components, data structures and so forth that perform particular tasks or implement particular abstract data types. Typically the functionality of the program modules may be combined or distributed as desired in various embodiments. Computing device 120 typically includes at least some form of computer readable media. Computer-readable media can be any available media that can be accessed by the computing device 120. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by the computing device 120. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

FIG. 1 shows functional components of one such handheld computing device 120, including a processor 122, a memory 124, a display 126, and a keyboard 128 (which may be a physical or virtual keyboard). The memory 124 generally includes both volatile memory (e.g., RAM) and non-volatile memory (e.g., ROM, PCMCIA cards, and so forth). An operating system 130 is resident in the memory 124 and executes on the processor 122, such as the Windows® CE operating system from Microsoft® Corporation, or another operating system.

One or more application programs 132 are loaded into memory 124 and run on the operating system 130. Examples of applications include email programs, scheduling programs, PIM (personal information management) programs, word processing programs, spreadsheet programs, Internet browser programs, and so forth. The handheld personal computer 120 may also include a notification manager 134 loaded in the memory 124, which executes on the processor 122. The notification manager 134 handles notification requests, e.g., from the application programs 132.

The handheld personal computer 120 has a power supply 136, which is implemented as one or more batteries. The power supply 136 may further include an external power source that overrides or recharges the built-in batteries, such as an AC adapter or a powered docking cradle.

The exemplary handheld personal computer 120 represented in FIG. 1 is shown with three types of external notification mechanisms: one or more light emitting diodes (LEDs) 140 and an audio generator 144. These devices may be directly coupled to the power supply 136 so that when activated, they remain on for a duration dictated by a notification mechanism even though the handheld personal computer processor 122 and other components might shut down to conserve battery power. The LED 140 preferably remains on indefinitely until the user takes action. Note that contemporary versions of the audio generator 144 use too much power for today's handheld personal computer batteries, and so it is configured to turn off when the rest of the system does or at some finite duration after activation.

Generalized Reference Decoder

Figure 2:
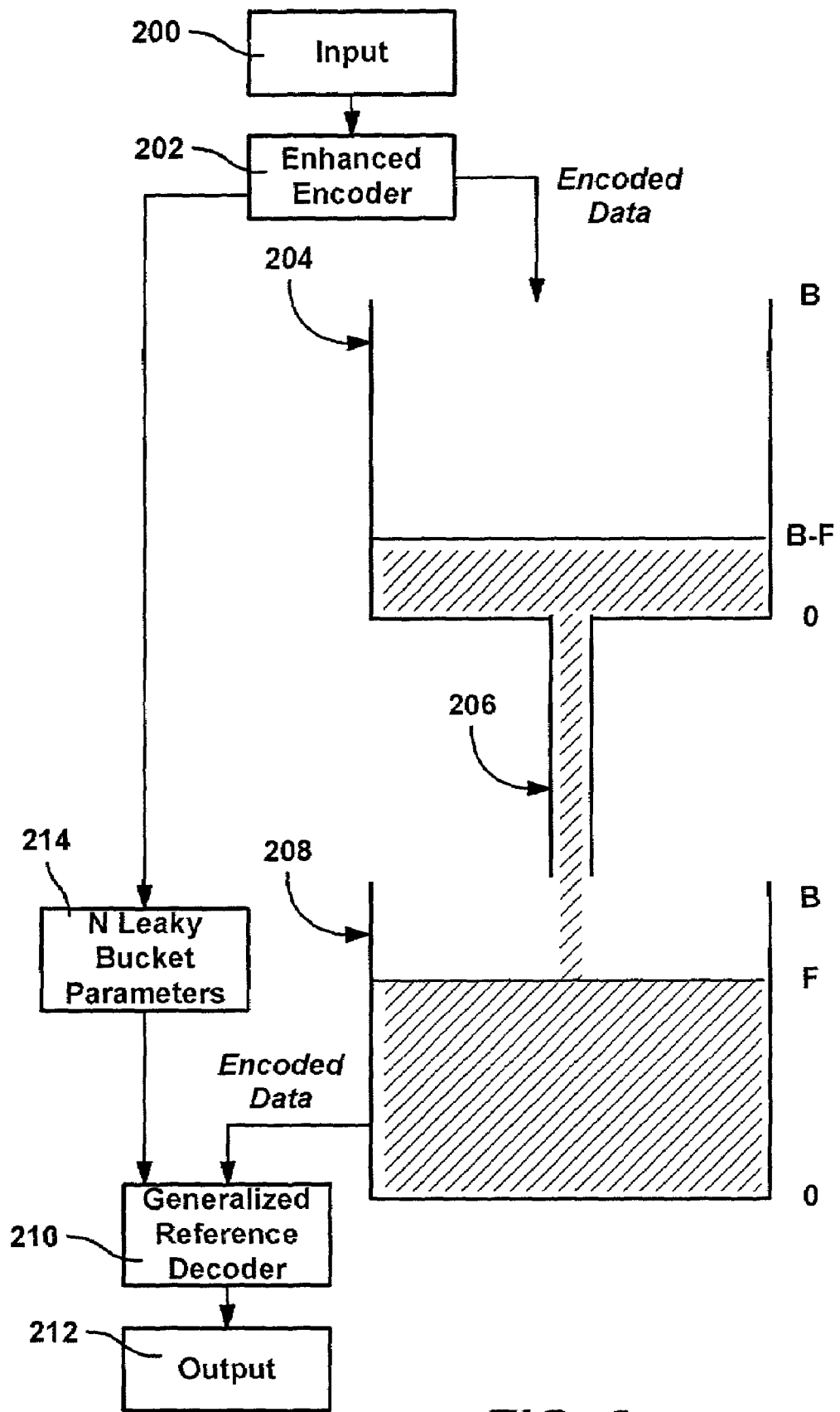
FIG. 2 is a block diagram representing the enhanced encoder and generalized reference decoder and their respective buffers for encoding and decoding video or image data in accordance with one aspect of the present invention.

A leaky bucket is a conceptual model of the state (or fullness) of an encoder or decoder buffer as a function of time. FIG. 2 shows this concept, wherein input data 200 is fed to an enhanced encoder 202 (described below) which encodes the data into an encoder buffer 204. The encoded data is transmitted through some transmission medium (pipe) 206 to a decoder buffer 208, which is then decoded by a decoder 210 into output data 212, such as an image or video frame. For purposes of simplicity, the decoder buffer 208 will be primarily described herein, because the fullness of the encoder and decoder buffers are conceptually complements of each other, i.e., the more data in the decoder buffer, the less in the encoder buffer, and vice-versa.

A leaky bucket model is characterized by a set of three parameters, R, B, and F, where R is the peak bit rate (in bits per second) at which bits enter the decoder buffer 208. In constant bit rate scenarios, R is often the channel bit rate and the average bit rate of the video or audio clip, and conceptually can be thought of as corresponding to the width of the pipe 206. B is the size of the bucket or decoder buffer 208 (in bits) which smoothes the video bit rate fluctuations. This buffer size cannot be larger than the physical buffer of the decoding device. F is the initial decoder buffer fullness (also in bits) that needs to be present before the decoder will start removing bits from the buffer. F is as least as great as the amount of encoded data that represents the initial frame. Leaving aside processing time, which for purposes of the present example may be considered instantaneous, F and R determine the initial or start-up delay D, where D=F/R seconds.

Thus, in a leaky bucket model, the bits enter the decoder buffer 208 at rate R until the level of fullness is F (i.e., for D seconds), and then the bits needed for the first frame, $b_0$ are removed (instantaneously in the present example). The bits keep entering the buffer at rate R, and the decoder removes $b_1$, $b_2, \ldots, b_{n-1}$ bits for the following frames at some given time instants, typically (but not necessarily) every 1/M seconds, where M is the frame rate of the video.

Figure 3:
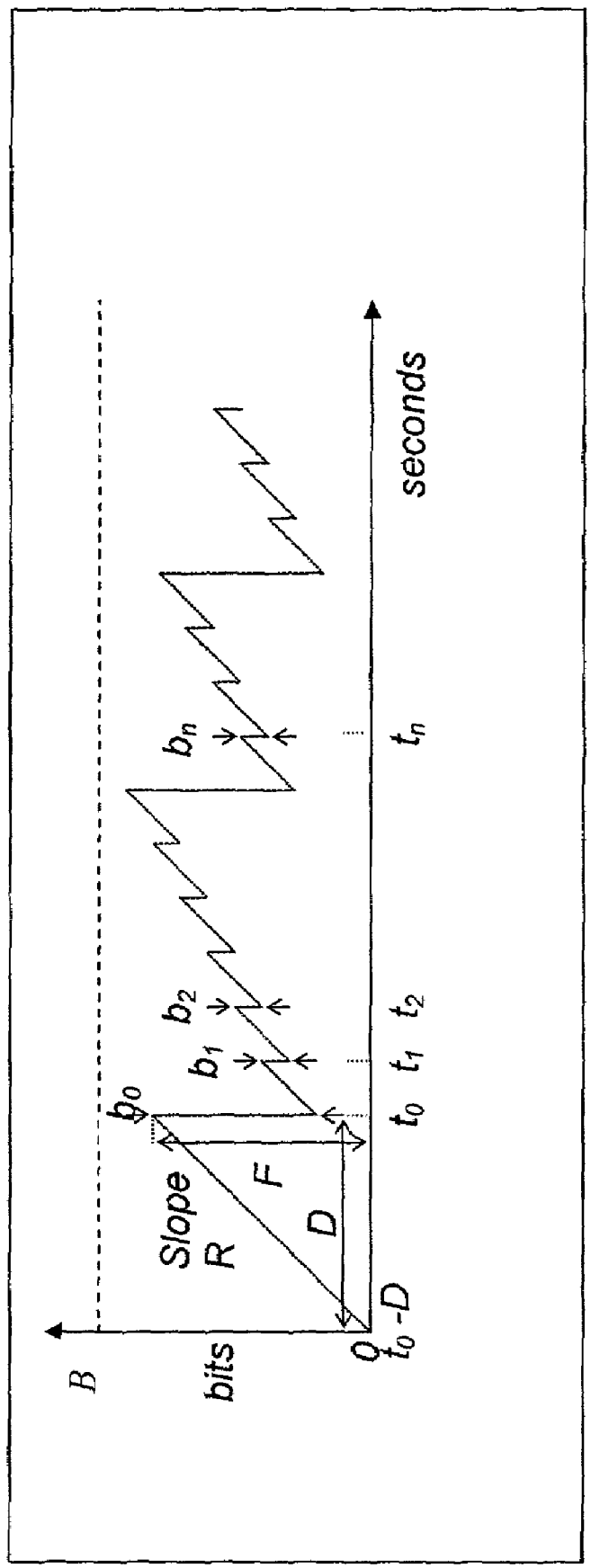
FIG. 3 is a graph of buffer fullness over time when contained in a leaky bucket of parameters (R, B, F)

FIG. 3 is a graph illustrating the decoder buffer fullness over time for a bit stream that is contained in a leaky bucket of parameters (R, B, F), as described above, wherein the number of bits for the ith frame is $b_i$. In FIG. 3, the coded video frames are removed from the buffer (typically according to the video frame rate), as shown by the drops in buffer fullness. More particularly, let $B_i$ be the decoder buffer fullness immediately before removing $b_i$ bits at time $t_i$. A generic leaky bucket model operates according to the following equations:

$B_0 = F$ $B_{i+1} = \min(B, B_i - b_i + R(t_{i+1} - t_i)), i = 0, 1, 2, \ldots$ Typically, $t_{i+1} - t_i = 1/M$ seconds, where M is the frame rate (in frames/sec) for the bit stream.

A leaky bucket model with parameters (R, B, F) contains a bit stream if there is no underflow of the decoder buffer 208 (FIG. 2). Because the encoder and decoder buffer fullness are complements of each other, this is equivalent to no overflow of the encoder buffer 204. However, the encoder buffer 204 (the leaky bucket) is allowed to become empty, or equivalently the decoder buffer 208 may become full, at which point no further bits are transmitted from the encoder buffer 204 to the decoder buffer 208. Thus, the decoder buffer 208 stops receiving bits when it is full, which is why the min operator is used in the second equation above. Because they are complements, a full decoder buffer 208 means that the encoder buffer 204 is empty, as described below with respect to variable bit rate (VBR) streams.

Note that a given video stream may be contained in various leaky bucket configurations. For example, if a video stream is contained in a leaky bucket with parameters (R, B, F), it will also be contained in a leaky bucket with a larger buffer (R, B', F), where B' is greater than B, or in a leaky bucket with a higher peak transmission rate (R', B, F), where R' is greater than R. Further, for any bit rate R', there is a buffer size that will contain the (time-limited) video bit stream. In the worst case, namely R' approaches zero, the buffer size will need to be as large as the bit stream itself. In other words, a video bit stream can be transmitted at any rate (regardless of the average bit rate of the clip) as long as the buffer size is large enough.

Figure 4:
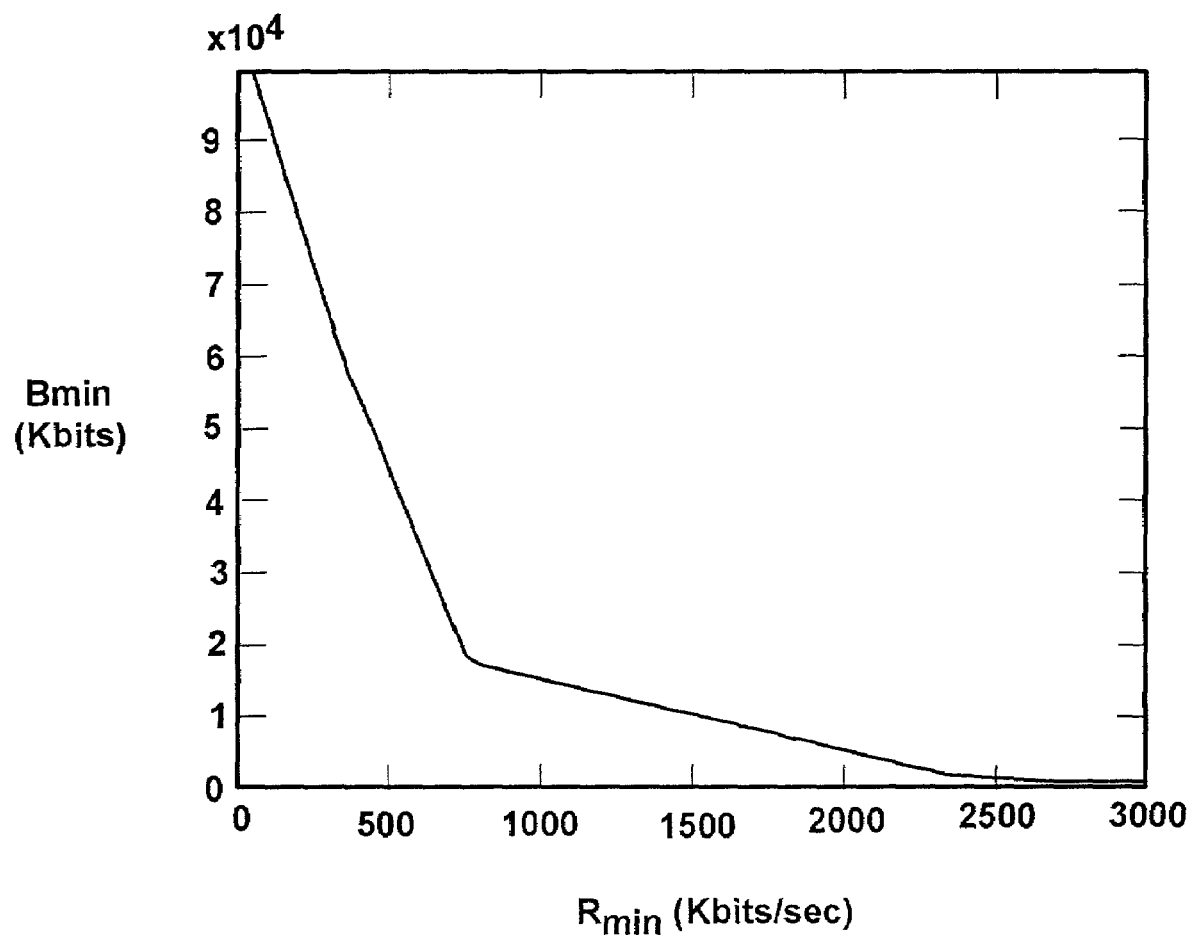
FIG. 4 is a representation of a rate versus buffer size curve for a representative video clip.

FIG. 4 is a graph of minimum buffer size $B_{min}$ against peak bit rate $R_{min}$ for a given bit stream, using the second equation above, where the desired initial buffer fullness is set at a constant fraction of the total buffer size. The curve in FIG. 4 indicates that in order to transmit the stream at a peak bit rate r, the decoder needs to buffer at least $B_{min}(r)$ bits. Further, as is understood from the graph, higher peak rates require smaller buffer sizes, and hence shorter start-up buffer delays. Alternatively, the graph indicates that if the size of the decoder buffer is b, the minimum peak rate required for transmitting the bit stream is the associated $R_{min}(b)$. Moreover, the curve of $(R_{min}, B_{min})$ pairs for any bit stream (such as the one in FIG. 4) is piecewise linear and convex.

In accordance with one aspect of the present invention, if at least two points of the curve are provided by the enhanced encoder 202, the generalized reference decoder 210 can select one point, or linearly interpolate between points, or extrapolate the points to arrive at some points $(R_{interp}, B_{interp})$ that are slightly but safely larger than $(R_{min}, B_{min})$. As a significant consequence, the buffer size may be safely reduced, in many instances by approximately an order of magnitude relative to a single leaky bucket containing the bit stream at its average rate, whereby the delay is likewise reduced. Alternatively, for the same delay, the peak transmission rate may be reduced by a factor of (possibly) four, or the signal to noise ratio (SNR) improved by (possibly) several dB.

To this end, the encoder 202 is enhanced by being arranged to generate at least two sets of leaky bucket parameters 214, e.g., $(R_1, B_1, F_1), (R_2, B_2, F_2), \ldots, (R_N, B_N, F_N)$, corresponding to at least two points on the Rate-Buffer curve that are useful (e.g., reasonably separated with respect to the range of R and/or B) for the given video or image clip. The enhanced encoder 202 then provides these leaky bucket parameter sets, along with the number N thereof, to the generalized reference decoder 210, such as by inserting them in an initial stream header, or alternatively in some out-of-band manner. Note that even for a relatively large N, (e.g., dozens of buckets, whereas two-to-four would normally suffice to reasonably represent an R-B curve), the amount of extra bytes necessary to provide this information (e.g., one byte for N, plus eight bytes per leaky bucket model, or parameter set) is negligible when compared to typical video or image data.

Further, note that at higher bit rates, the content creator may decide to specify different leaky bucket models at different times in the bit stream, which would be useful whenever a connection fails during transmission and is re-started in the middle of a bit stream. For example, leaky bucket models may be provided for fifteen minute intervals, such that the decoder may change its operating conditions (e.g., its buffer size or the rate) as desired by re-selecting, re-interpolating or re-extrapolating at appropriate times.

The desired value of N can be selected by the encoder, (noting that if N=1, the generalized decoder 210 will extrapolate points like an MPEG video buffering verifier). The encoder can choose to pre-select the leaky bucket values and encode the bit stream with a rate control that makes sure that the leaky bucket constraints are met, encode the bit stream and then use the equation described above to compute sets of leaky bucket parameters containing the bit stream at N different values of R, or do both. The first approach can be applied to live or on-demand transmission, while the others apply to on-demand.

Figure 5:
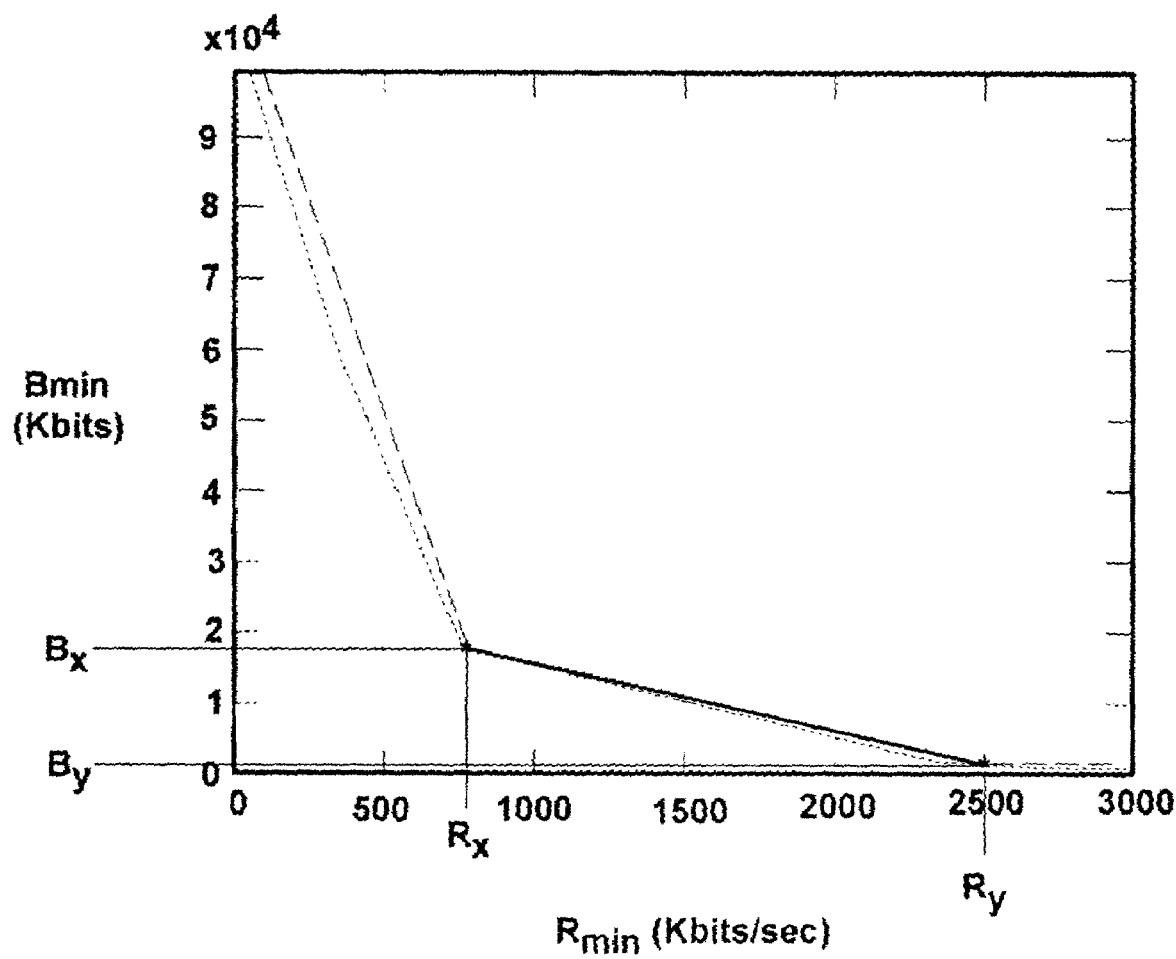
FIG. 5 is a representation of the rate versus buffer size curve for a representative video clip with two leaky bucket models (parameter sets) provided to the generalized reference decoder for interpolation and extrapolation in accordance with one aspect of the present invention.

In keeping with the present invention, once received at the generalized reference decoder 210, the decoder 210 can determine which leaky bucket it wishes to use, knowing the peak bit rate available to it and/or its physical buffer size. Alternatively, the generalized reference decoder 210 may linearly interpolate between or linearly extrapolate from these points to find a suitable set of parameters for a given configuration. FIG. 5 shows two leaky bucket parameters sets and their linearly interpolated (R, B) values. For reference, the calculated R-B curve is represented as the finely broken line, while the R and B values provided in the leaky bucket models $(R_x, B_x)$ and $(R_y, B_y)$ are represented by asterisks. The solid line from $(R_x, B_x)$ to $(R_y, B_y)$ represents the interpolated values. Any R or B pairing chosen on this solid line will properly maintain (e.g., not overflow or underflow) the decoder buffer 208. Leaky bucket parameters can also be extrapolated from these points, represented by the coarsely broken lines in FIG. 5, and again, any R or B pairing chosen on this solid line will properly maintain the decoder buffer 208.

The interpolated buffer size B between points k and k+1 follow the straight line:

$$B = \frac{R - R_k}{R_{k+1} - R_k} B_k + \frac{R_{k+1} - R}{R_{k+1} - R_k} B_{k+1}$$

where $R_k < R < R_{k+1}$.

Likewise, the initial decoder buffer fullness F can be linearly interpolated:

$$F = \frac{R - R_k}{R_{k+1} - R_k} F_k + \frac{R_{k+1} - R}{R_{k+1} - R_k} F_{k+1}$$

where $R_k < R < R_{k+1}$.

The resulting leaky bucket with parameters (R, B, F) is guaranteed to contain the bit stream, because, (as is mathematically provable) the minimum buffer size $B_{min}$ is convex in both R and F, that is, the minimum buffer size $B_{min}$ corresponding to any convex combination $(R,F)=a(R_k,F_k)+(1-a)(R_{k+1},F_{k+1})$, $0<a<1$, is less than or equal to $B=aB_k+(1-a)B_{k+1}$.

As described above, when R is larger than $R_N$, the leaky bucket (R, $B_N$, $F_N$) will also contain the bit stream, whereby $B_N$ and $F_N$ are the buffer size and initial decoder buffer fullness recommended when $R \geq R_N$. If R is smaller than $R_1$, the upper bound $B=B_1+(R_1-R)T$ can be used, where T is the time length of the stream in seconds. These (R, B) values outside the range of the N points may be extrapolated.

It should be noted that the decoder need not select, interpolate or extrapolate the leaky bucket parameters, but rather another entity can select the parameters for sending a single set to the decoder, which will then use that one set. For example, given some information such as a decoder's requirements, a server can determine (through selection, interpolation or extrapolation) an appropriate set of leaky bucket parameters to send to a decoder, and then the decoder can decode using only a single set of parameters. A proxy for the server or decoder could also do the selection, interpolation or extrapolation of the leaky bucket information, without the decoder ever seeing more than one leaky bucket. In other words, instead of the decoder deciding, the server can decide, possibly with the server and client decoder negotiating the parameters. In general however, and in keeping with the present invention, some determination of an appropriate leaky bucket model takes place, either in advance or dynamically, based on at least two leaky bucket models.

The values of the R-B curve for a given bit stream can be computed from the times at which the highest and lowest fullness values occur in the decoder buffer plot, such as those illustrated in FIG. 3. More particularly, consider two times (tM, tm), of the highest and lowest values of decoder buffer fullness, respectively, for a bit stream contained in a leaky bucket of parameters (R, B, F). The highest and lowest values of fullness may be reached on several occasions, but consider the pair (tM, tm) of largest values such that tM<tm. Assuming that the leaky bucket is computed properly, B is the minimum buffer size that contains the bit stream for the values R, F, then $$B = \sum_{t=t_M}^{t=t_m} \left( b(t) - \frac{R}{M} \right) = \sum_{t=t_M}^{t=t_m} b(t) - n \frac{R}{M} = -n \frac{R}{M} + c,$$

where b(t) is the number of bits for the frame at time t and M is the frame rate in frames/sec. In this equation, n is the number of frames between times tM and tm, and c is the sum of the bits for those frames.

This equation can be interpreted as a point in a straight line B(r), where r=R and −n/M is the slope of the line. There is a bit rate range $r \in [R-r1, R+r2]$ such that the largest pair of values tM and tm will remain the same, whereby the above equation corresponds to a straight line that defines the minimum buffer size B associated to the bit rate r. If the bit rate r is outside of the range above, at least one of the values tM and/or tm will change, whereby if r>R+r2, the time distance between tM and tm will be smaller and the value of n in the new straight line defining B(r) will also be smaller, and the slope of the respective line will be larger (less negative). If r<R−r1, the time distance between tM and tm will be larger and the value of n in the straight line defining B(r) will also be larger. The slope of the line will then be smaller (more negative).

The values of the pairs (tM, tm) for a range of bit rates (or the associated values of n) and some values of c (at least one for a given pair) may be stored in the header of a bit stream, and thus the piece-wise linear B(r) curve could be obtained using the above equation. In addition, this equation may be used to simplify the computation of leaky bucket model parameters after an encoder has generated a bit stream.

In testing, the bit stream in FIG. 5 was produced, yielding an average bit rate of 797 Kbps. As generally shown in FIG. 5, at a constant transmission rate of 797 Kbps, the decoder would need a buffer size of about 18,000 Kbits ($R_x$, $B_x$). With an initial decoder buffer fullness equal to 18,000 Kbits, the start-up delay would be about 22.5 seconds. Thus, this encoding (produced with no rate control) shifts bits by up to 22.5 seconds in order to achieve essentially best possible quality for its overall encoded length.

FIG. 5 also shows that at a peak transmission rate of 2,500 Kbps (e.g., the video bit rate portion of a 2× CD), the decoder would need a buffer size of only 2,272 Kbits, ($R_y$, $B_y$), which is reasonable for a consumer hardware device. With an initial buffer fullness equal to 2,272 Kbits, the start-up delay would be only about 0.9 seconds.

Thus for this encoding, two leaky bucket models might typically be useful, e.g., (R=797 Kbps, B=18,000 Kbits, F=18,000 Kbits) and (R=2,500 Kbps, B=2,272 Kbits, F=2,272 Kbits). This first leaky bucket parameter set would permit transmission of the video over a constant bit rate channel, with a delay of about 22.5 seconds. While this delay may be too large for many scenarios, it is probably acceptable for internet streaming of movies, for example. The second set of leaky bucket parameters would permit transmission of the video over a shared network with peak rate 2,500 Kbps, or would permit local playback from a 2× CD, with a delay of about 0.9 seconds. This sub-second delay is acceptable for random access playback with VCR (video cassette recorder)-like functionality.

The benefits are apparent when considering what occurs when only the first leaky bucket was specified in the bit stream, but not the second. In such an event, even when playing back over a channel with peak bit rate 2,500 Kbps, the decoder would use a buffer of size 18,000 Kbits, and thus the delay would be F/R=18,000 Kbits/2,500 Kbps =7.2 seconds. As can be appreciated, such a delay is unacceptable for random access playback, such as with VCR-like functionality. However, if the second leaky bucket is additionally specified, then at rate 2,500 Kbps the buffer size drops to 2,272 Kbits and the delay drops to 0.9 seconds, as described above.

On the other hand, if only the second leaky bucket was specified, but not the first, then at a constant transmission rate of 797 Kbps, even a smart decoder would be forced to use a buffer that is far larger than necessary, to ensure that the buffer will not overflow, namely B'=B+(R−R')T=2,272 Kbits+(2,500 Kbps−797 Kbps)×130 seconds=223,662 Kbits. Even if this much memory is available in a given device, this corresponds to an initial delay of 281 seconds, or nearly five minutes, which is far from acceptable. However, if the first leaky bucket is specified as well, then at a rate of 797 Kbps, the buffer size drops to 18,000 Kbits and the delay drops to 22.5 seconds, as described above.

Moreover, when both leaky buckets are specified, then the decoder can linearly interpolate between them (using the above interpolation formulas), for any bit rate R between 797 Kbps and 2,500 Kbps, thereby achieving near-minimal buffer size and delay at any given rate. Extrapolation (represented in FIG. 5 by the coarsely broken line) is also more efficient both below 797 Kbps and above 2,500 Kbps, compared to extrapolation with only a single leaky bucket anywhere between 797 Kbps and 2,500 Kbps, inclusive.

As demonstrated by the above example, even just two sets of leaky bucket parameters can provide an order of magnitude reduction in buffer size (e.g., 223,662 to 18,000 Kbits in one case, and 18,000 to 2,272 Kbits in another), and an order of magnitude reduction in delay (e.g., 281 to 22.5 seconds in one case and 7.2 to 0.9 seconds in another) at a given peak transmission rate.

Alternatively, it is also possible to reduce the peak transmission rate for a given decoder buffer size. Indeed, as is clear from FIG. 5, if the R-B curve can be obtained by interpolating and/or extrapolating multiple leaky buckets, then it is possible for a decoder with a fixed physical buffer size to choose the minimum peak transmission rate needed to safely decode the bit stream without decoder buffer underflow. For example, if the decoder had a fixed buffer of size 18,000 Kbits, then the peak transmission rate for the encoding can be as low as 797 Kbps. However, if only the second leaky bucket is specified, but not the first, then the decoder can reduce the bit rate to no less than R'=R−(B'−B)/T=2,500 Kbps−(18,000 Kbits−2,272 Kbits)/130 seconds=2,379 Kbps. In this case, compared to using a single leaky bucket, using just two leaky buckets reduces the peak transmission rate by a factor of four, for the same decoder buffer size.

Having multiple leaky bucket parameters can also improve the quality of the reconstructed video, at the same average encoding rate. Consider the situation wherein both leaky buckets are available for the encoding. As described above, with this information at the decoder, it is possible to play back the encoding with a delay of 22.5 seconds if the peak transmission rate is 797 Kbps, and with a delay of 0.9 seconds if the peak transmission rate is 2,500 Kbps.

However, if the second leaky bucket is unavailable, then the delay increases from 0.9 to 7.2 seconds at 2,500 Kbps. One way to reduce the delay back to 0.9 seconds without the benefit of the second leaky bucket is to re-encode the clip with rate control, by reducing the buffer size (of the first leaky bucket) from 18,000 Kbits to (0.9 seconds)×(2,500 Kbps)=2,250 Kbits. This would ensure that the delay is only 0.9 seconds if the peak transmission rate is 2,500 Kbps, although the delay at 797 Kbps would also decrease, from 22.5 to 2.8 seconds. However, as a consequence, the quality (SNR) would also decrease by an amount estimated to be several dB, especially for a clip with a large dynamic range.

Thus, specifying a second leaky bucket can increase the SNR by possibly several dB, with no change in the average bit rate, except for the negligible amount of additional bits per clip to specify the second leaky bucket. This increase in SNR will be visible on playback for every peak transmission rate.

The benefits of specifying multiple leaky buckets to the generalized reference decoder are realized where a single encoding is transmitted over channels with different peak rates, or to devices with different physical buffer sizes. However, in practice this is becoming more and more common. For example, content that is encoded offline and stored on a disk is often played back locally, as well as streamed over networks with different peak rates. Even for local playback, different drives speeds (e.g., 1×CD through 8×DVD) affect the peak transfer rate. Moreover, the peak transmission rates through network connections also vary dramatically according to the speed of the limiting link, which is typically near the end user (e.g., 100 or 10 baseT Ethernet, T1, DSL, ISDN, modems, and so forth). Buffer capacities of playback devices also vary significantly, from desktop computers with gigabytes of buffer space to small consumer electronic devices with buffer space that is smaller by several orders of magnitude. The multiple leaky buckets and the proposed generalized reference decoder of the present invention make it possible for the same bit stream to be transmitted over a variety of channels with the minimum startup delay, minimum decoder buffer requirements, and maximum possible quality. This applies not only to video that is encoded off-line, but also to live video that is broadcast simultaneously through different channels to different devices. In short, the proposed generalized reference decoder adds significant flexibility to existing bit streams.

As can be seen from the foregoing detailed description, there is provided an improved generalized reference decoder relative to those in prior standards. The generalized reference decoder requires only a small amount of information from the encoder (e.g., at the header of the bit stream) to provide much higher flexibility for bit stream delivery through contemporary networks where bandwidth is variable bandwidth and/or terminals have a variety of bit rate and buffering capabilities. The reference decoder of the present invention enables these new scenarios, while reducing the transmission delay to a minimum for the available bandwidth, and in addition, virtually minimizes the channel bit rate requirement for delivery to devices with given physical buffer size limitations.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A method of decoding video with a video decoder, the method comprising:
   at the video decoder, receiving a given bit stream of encoded data for a given video clip;
   at the video decoder, receiving multiple sets of reference decoder parameters signaled for the given bit stream of encoded data for the given video clip, wherein each of the multiple sets comprises a rate parameter and a decoder buffer size parameter for a reference decoder model that specifies constraints on fluctuations of the given bit stream of encoded data for the given video clip, and wherein each of the multiple sets indicates a different and alternative combination of rate parameter and decoder buffer size parameter for the same video images in the given bit stream of encoded data for the given video clip;

with the video decoder, determining an operating condition using any of the multiple sets, wherein the operating condition indicates peak rate or decoder buffer size for decoding the encoded data for the given video clip, and wherein the multiple sets are concurrently available for use in the determining the operating condition; and with the video decoder, decoding the encoded data for the given video clip in accordance with the operating condition.

2. The method of claim 1 wherein the decoder buffer size parameter for each of the multiple sets is different.

3. The method of claim 1 wherein the rate parameter for each of the multiple sets is different.

4. The method of claim 1 further comprising: at the video decoder, receiving multiple additional sets of reference decoder parameters;

with the video decoder, re-determining the operating condition using any of the multiple additional sets; and with the video decoder, decoding the encoded data for the given video clip in accordance with the re-determined operating condition.

5. The method of claim 1 further comprising, at the video decoder, receiving a number parameter that indicates how many sets of reference decoder parameters are signaled for the given bit stream of encoded data for the given video clip.

6. The method of claim 1 wherein the determining comprises selecting a parameter of one of the multiple sets.

7. The method of claim 1 wherein the determining comprises interpolating between parameters of two of the multiple sets.

8. The method of claim 1 wherein the determining comprises extrapolating from a parameter of one of the multiple sets.

9. The method of claim 1 wherein the peak rate is minimum peak rate, and wherein the determining comprises setting the minimum peak rate based upon one or more of the decoder buffer size parameters of the multiple sets.

10. The method of claim 1 wherein the determining comprises setting the decoder buffer size based upon one or more of the rate parameters of the multiple sets.

11. The method of claim 1 wherein the multiple sets are signaled in a stream header for the given bit stream of encoded data for the given video clip.

12. The method of claim 1 wherein the multiple sets are signaled out-of-band for the given video clip.

13. The method of claim 1 wherein each of the multiple sets further comprises an initial buffer fullness parameter.

14. The method of claim 1 wherein each of the multiple sets represents a different leaky bucket model for the given bit stream of encoded data for the given video clip.

15. The method of claim 1 wherein each of the multiple sets represents a different point along a rate-decoder buffer size curve for the given bit stream of encoded data for the given video clip.

16. The method of claim 1 wherein the given video clip is an entire video sequence.

17. The method of claim 1 wherein the given video clip is part of a video sequence.

18. The method of claim 1 wherein the decoder is implemented a handheld computing device.

19. The method of claim 1 wherein the decoder is implemented in a personal computer.

20. The method of claim 1 wherein the decoder is implemented in a disk media player.

21. The method of claim 1 wherein the peak rate corresponds to a drive speed for a disk drive during the decoding the encoded data.

22. The method of claim 1 wherein the peak rate corresponds to a transmission rate for a network connection during the decoding the encoded data.

23. The method of claim 1 wherein the decoding the encoded data occurs during live video transmission for the given video clip.

24. The method of claim 1 wherein the decoding the encoded data occurs during on-demand transmission for the given video clip.

25. A method of decoding video with a video decoder, the method comprising:

at the video decoder, receiving multiple sets of reference decoder parameters signaled for a given bit stream of encoded data for a given video clip, wherein each of the multiple sets comprises a rate parameter and a decoder buffer size parameter for a reference decoder model that specifies constraints on fluctuations of the given bit stream of encoded data for the given video clip, and wherein each of the multiple sets indicates a different and alternative combination of rate parameter and decoder buffer size parameter for the same video images in the given bit stream of encoded data for the given video clip;

with the video decoder, processing the multiple sets, wherein the multiple sets are concurrently available for use in determination of an operating condition, and wherein the operating condition indicates peak rate or decoder buffer size for decoding the encoded data for the given video clip; and with the video decoder, decoding the encoded data for the given video clip.

26. The method of claim 25 wherein the decoder buffer size parameter for each of the multiple sets is different.

27. The method of claim 25 wherein the rate parameter for each of the multiple sets is different.

28. The method of claim 25 further comprising, at the video decoder, receiving a number parameter that indicates how many sets of reference decoder parameters are signaled for the given bit stream of encoded data for the given video clip.

29. The method of claim 25 further comprising:

at the video decoder, receiving multiple additional sets of reference decoder parameters signaled for the given bit stream of encoded data for the given video clip; and with the video decoder, processing the multiple additional sets, wherein the multiple additional sets are concurrently available for use in re-determination of the operating condition.

30. The method of claim 25 wherein the multiple sets are signaled out of band.

31. The method of claim 25 wherein the processing comprises reading the multiple sets from a stream header of the bit stream.

32. The method of claim 25 wherein the processing comprises determining the operating condition.

33. The method of claim 25 wherein each of the multiple sets further comprises an initial buffer fullness parameter.

34. The method of claim 25 wherein each of the multiple sets represents a different leaky bucket model for the given bit stream of encoded data for the given video clip.

35. The method of claim 25 wherein each of the multiple sets represents a different point along a rate-decoder buffer size curve for the given bit stream of encoded data for the given video clip.

36. The method of claim 25 wherein the given video clip is part of a video sequence.

37. The method of claim 25 wherein the peak rate corresponds to a drive speed for a disk drive during the decoding the encoded data.

38. The method of claim 25 wherein the peak rate corresponds to a transmission rate for a network connection during the decoding the encoded data.

39. The method of claim 25 wherein the decoding the encoded data occurs during live video transmission for the given video clip.

40. The method of claim 25 wherein the decoding the encoded data occurs during on-demand transmission for the given video clip.

41. A method of decoding video with a video decoder, the method comprising:
at the video decoder, receiving a number parameter that indicates how many sets of reference decoder parameters are signaled for a given bit stream of encoded data for a given video clip;
at the video decoder, receiving multiple sets of reference decoder parameters signaled for the given bit stream of encoded data for the given video clip, wherein each of the multiple sets comprises a rote parameter and a decoder buffer size parameter for a reference decoder model that specifies constraints on fluctuations of the given bit stream of encoded data for the given video clip, and wherein each of the multiple sets represents a different and alternative point along a rate-decoder buffer size curve for the same video images in the given bit stream of encoded data for the given video clip;
with the video decoder, processing the multiple sets, wherein the multiple sets are concurrently available for use in determination of an operating condition, and wherein the operating condition indicates peak rate or decoder buffer size for decoding the encoded data for the given video clip; and
with the video decoder, decoding the encoded data for the given video clip.

42. The method of claim 41 wherein the decoder buffer size parameter for each of the multiple sets is different, and wherein the rate parameter for each of the multiple sets is different.

43. The method of claim 41 wherein the number parameter and the multiple sets are signaled out of band.

44. The method of claim 41 wherein the processing comprises reading the multiple sets from a stream header of the bit stream.

45. The method of claim 41 wherein the processing comprises determining the operating condition.

46. The method of claim 45 wherein the determining comprises selecting a parameter of one of the multiple received sets, interpolating between parameters of two of the multiple sets, or extrapolating from a parameter of one of the multiple sets.

47. The method of claim 45 wherein the peak rate corresponds to a drive speed for a disk drive during the decoding the encoded data.

48. The method of claim 45 wherein the peak rate corresponds to a transmission rate for a network connection during the decoding the encoded data.

49. The method of claim 45 wherein the decoding The encoded data occurs during on-demand transmission for the given video clip.

50. A method of decoding video with a video decoder, the method comprising:
at the video decoder, receiving multiple sets of reference decoder parameters signaled for a given bit stream of encoded data for a given video clip, wherein each of the multiple sets comprises a rate parameter and a decoder buffer size parameter for a reference decoder model that specifics constraints on fluctuations of the given bit stream of encoded data for the given video clip, and wherein each of the multiple sets indicates a different and alternative combination of rate parameter and decoder buffer size parameter for the same video images in the given bit stream of encoded data for the given video clip;
with the video decoder, processing the multiple sets, wherein the multiple sets arc concurrently available for use in determination of an operating condition, and wherein the operating condition indicates peak rate or decoder buffer size for decoding the encoded data for the given video clip;
at the video decoder, receiving multiple additional sets of reference decoder parameters signaled for the given bit stream of encoded data for the given video clip;
with the video decoder, processing the multiple additional sets, wherein the multiple additional sets are concurrently available for use in re-determination of the operating condition, and wherein each of the multiple sets and multiple additional sets represents a different leaky bucket model for the given video clip; and
with the video decoder, decoding the encoded data for the given video clip.

51. The method of claim 50 wherein the decoder buffer size parameter for each of the multiple sets is different, and wherein the rate parameter for each of the multiple sets is different.

52. The method of claim 50 wherein the processing comprises determining the operating condition, and wherein the determining comprises selecting a parameter of one of the multiple received sets, interpolating between parameters of two of the multiple sets, or extrapolating from a parameter of one of the multiple sets.

53. The method of claim 50 wherein the processing comprises determining the operating condition, and wherein the determining comprises setting the peak rate based upon one or more of the decoder buffer size parameters of the multiple sets or setting the decoder buffer size based upon one or more of the rate parameters of the multiple sets.

54. A method of decoding video with a video decoder, the method comprising:
at the video decoder, receiving a number parameter that indicates how many sets of reference decoder parameters are signaled for a given bit stream of encoded data for a given video clip;
at the video decoder, receiving multiple sets of reference decoder parameters signaled for the given bit stream of encoded data for the given video clip, wherein each of the multiple sets comprises a rate parameter and a decoder buffer size parameter for a reference decoder model that specifies constraints on fluctuations of the given bit stream of encoded data for the given video clip;
with the video decoder, determining an operating condition using any of the multiple sets, wherein the operating condition indicates peak rate or decoder buffer size for decoding the encoded data for the given video clip, wherein the multiple sets are concurrently available for use in the determining the operating condition, and wherein each of the multiple sets represents a different and alternative point along a rate-decoder buffer size curve for the same video images in the given bit stream of encoded data for the given video clip; and with the video decoder, decoding the encoded data for the given video clip in accordance with the operating condition.

55. The method of claim 54 wherein the decoder buffer size parameter for each of the multiple sets is different, and wherein the rate parameter for each of the multiple sets is different.

56. The method of claim 54 wherein the number parameter and the multiple sets are signaled in a stream header for the given bit stream of encoded data for the given video clip.

57. The method of claim 54 wherein the number parameter and the multiple sets are signaled out-of-band for the given video clip.

58. The method of claim 54 wherein the determining comprises selecting a parameter of one of the multiple received sets, interpolating between parameters of two of the multiple sets, or extrapolating from a parameter of one of the multiple sets.

59. The method of claim 54 wherein the decoder is implemented in a handheld computing device, in a personal computer, or in a disk media player.

60. The method of claim 54 wherein the decoding the encoded data occurs during on-demand transmission for the given video clip.

61. A video decoder comprising:
a processor;
memory; and
non-volatile storage media;
wherein the processor, memory, and non-volatile storage media implement a video decoder adapted to:
receive multiple sets of reference decoder parameters signaled for a given bit stream of encoded data for a given video clip, wherein each of the multiple sets comprises a rate parameter and a decoder buffer size parameter for a reference decoder model that specifies constraints on fluctuations of the given bit stream of encoded data for the given video clip, and wherein each of the multiple sets indicates a different and alternative combination of rate parameter and decoder buffer size parameter for the same video images in the given bit stream of encoded data for the given video clip;
process the multiple sets, wherein the multiple sets are concurrently available for use in determination of an operating condition, and wherein the operating condition indicates peak rate or decoder buffer size for decoding the encoded data for the given video clip; and
decode the encoded data for the given video clip.

62. The video decoder of claim 61 wherein the decoder buffer size parameter for each of the multiple sets is different, and wherein the rate parameter for each of the multiple sets is different.

63. The video decoder of claim 61 wherein the processing comprises determining the operating condition.

64. The video decoder of claim 63 wherein the determining comprises selecting a parameter of one of the multiple received sets, interpolating between parameters of two of the multiple sets, or extrapolating from a parameter of one of the multiple sets.

65. A computing device comprising
a processor;
memory;
an input device; and
non-volatile storage medium;
wherein the processor, memory, and non-volatile storage medium implement a video decoder adapted to:
receive multiple sets of reference decoder parameters signaled for a given bit stream of encoded data for a given video clip, wherein each of the multiple sets comprises a rate parameter and a decoder buffer size parameter for a reference decoder model that specifies constraints on fluctuations of the given bit stream of encoded data for the given video clip, and wherein each of the multiple sets indicates a different and alternative combination of rate parameter and decoder buffer size parameter for the same video images in the given bit stream of encoded data for the given video clip;
process the multiple sets, wherein the multiple sets are concurrently available for use in determination of an operating condition, and wherein the operating condition indicates peak rate or decoder buffer size for decoding the encoded data for the given video clip; and
decode the encoded data for the given video clip.

* * * * *

UNITED STATES PATENT AND TRADEMARK OFFICE
CERTIFICATE OF CORRECTION

PATENT NO. : 7,646,816 B2  Page 1 of 1
APPLICATION NO. : 09/955731
DATED : January 12, 2010
INVENTOR(S) : Ribas-Corbera et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 867 days.

Signed and Sealed this

Sixteenth Day of November, 2010

David J. Kappos
*Director of the United States Patent and Trademark Office*